US010963743B2

(12) United States Patent
Lecue et al.

(10) Patent No.: US 10,963,743 B2
(45) Date of Patent: Mar. 30, 2021

(54) MACHINE LEARNING WITH SMALL DATA SETS

(71) Applicant: Accenture Global Solutions Limited, Dublin (IE)

(72) Inventors: Freddy Lecue, Dublin (IE); Chahrazed Bouhini, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 459 days.

(21) Appl. No.: 15/996,073

(22) Filed: Jun. 1, 2018

(65) Prior Publication Data
US 2019/0370607 A1 Dec. 5, 2019

(51) Int. Cl.
*G06F 15/18* (2006.01)
*G06K 9/62* (2006.01)
*G06N 20/00* (2019.01)
*G06F 16/34* (2019.01)

(52) U.S. Cl.
CPC .......... *G06K 9/6262* (2013.01); *G06F 16/34* (2019.01); *G06N 20/00* (2019.01)

(58) Field of Classification Search
CPC ....... G06K 9/6262; G06F 16/34; G06N 20/00
See application file for complete search history.

(56) References Cited

U.S. PATENT DOCUMENTS

| 2002/0068857 | A1* | 6/2002 | Iliff | G16H 15/00 600/300 |
| 2014/0058986 | A1* | 2/2014 | Boss | G06N 20/00 706/12 |
| 2019/0005395 | A1* | 1/2019 | Dutkowski | G06N 20/00 |
| 2020/0143149 | A1* | 5/2020 | Han | G06K 9/00268 |

* cited by examiner

*Primary Examiner* — Peet Dhillon
(74) *Attorney, Agent, or Firm* — Fish & Richardson P.C.

(57) ABSTRACT

Implementations include receiving a predicted value and confidence level from a first ML model, and determining that the confidence level is below a threshold, and in response: providing an encoding based on input data and non-textual information to the first ML model, the encoding representing characteristics of the input data relative to the predicted value, the characteristics including respective gradients of features of the input data, injecting the encoding into a textual knowledge graph that corresponds to a domain of the first ML model to provide an encoded knowledge graph, receiving supplemental data based on the encoded knowledge graph, and providing a supplemental predicted value from a second ML model based on the input data and the supplemental data, the second ML model having a higher number of features than the first ML model, and the supplemental predicted value having a supplemental confidence level that exceeds the threshold.

22 Claims, 7 Drawing Sheets

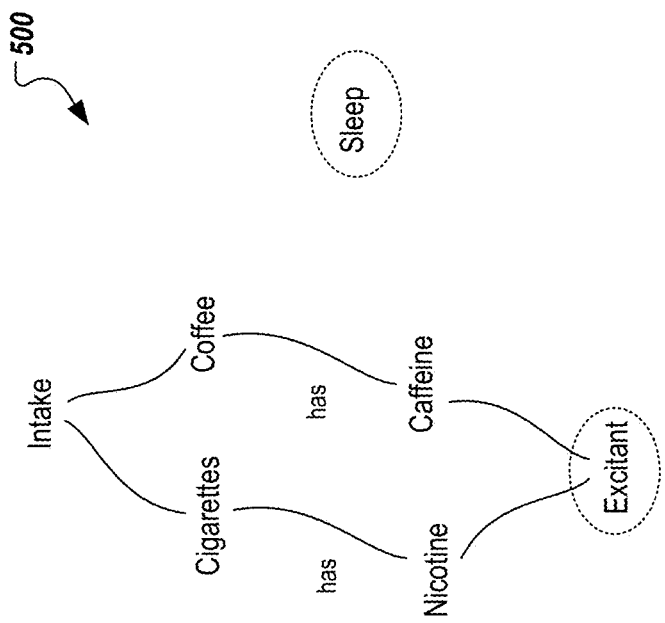

MACHINE LEARNING WITH SMALL DATA SETS

BACKGROUND

Machine-learning (ML) models predict values based on input data/input features. ML models can be trained using one or more training techniques (e.g., supervised learning, unsupervised learning, semi-supervised learning). ML models can include multiple features, each feature being a measurable property, or characteristic of a phenomenon that the ML model represents. An accuracy of a predicted value from predictive ML models can vary based on a number and the efficiency of features accounted for in the input data. For example, while fewer features in the input data may result in more rapid processing of the input data through the ML model, the resulting predicted value can be less accurate than desired.

SUMMARY

Implementations of the present disclosure are generally directed to improving prediction accuracy of machine-learning (ML) models. More particularly, implementations of the present disclosure are directed to selectively leveraging knowledge graphs to add one or more features for improving accuracy of predicted values of a ML model.

In some implementations, actions include receiving a predicted value and confidence level from a computer-executed first ML model, and determining that the confidence level is below a threshold confidence level, and in response: providing an encoding based on input data and non-textual information to the first ML model, the encoding representing characteristics of the input data relative to the predicted value, the characteristics including respective gradients of two or more features of the input data, injecting the encoding into a textual knowledge graph that corresponds to a domain of the first ML model to provide an encoded knowledge graph, receiving supplemental data based on the encoded knowledge graph, and providing a supplemental predicted value from a second ML model based on the input data and the supplemental data, the second ML model having a higher number of features than the first ML model, and the supplemental predicted value having a supplemental confidence level that exceeds the threshold confidence level. Other implementations of this aspect include corresponding systems, apparatus, and computer programs, configured to perform the actions of the methods, encoded on computer storage devices.

These and other implementations can each optionally include one or more of the following features: at least part of the input data varies over a temporal dimension; injecting the encoding at least partially includes providing a link between the encoding and one or more nodes of the textual knowledge graph; injecting the encoding into a knowledge graph includes: comparing the encoding to respective encodings of a set of injection points (IPs) included in the knowledge graph to provide a sub-set of IPs, and identifying an IP in the sub-set of IPs to determine one or more channels for obtaining the supplemental data; the sub-set of IPs includes one or more IPs having a respective encoding that is within a pre-defined degree of permutation from the encoding; identifying an IP in the sub-set of IPs includes: determining that the set of IPs includes multiple IPs, and, in response, providing respective similarity scores, and identifying the IP as having a highest similarity score among the similarity scores; the supplemental data includes one or more user responses to one or more queries transmitted to the user; and the one or more queries are determined based on at least one action, the action resulting in data that is processed to provide the one or more queries.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 5 depicts an example portion of a knowledge graph.

DETAILED DESCRIPTION

Figure 1:
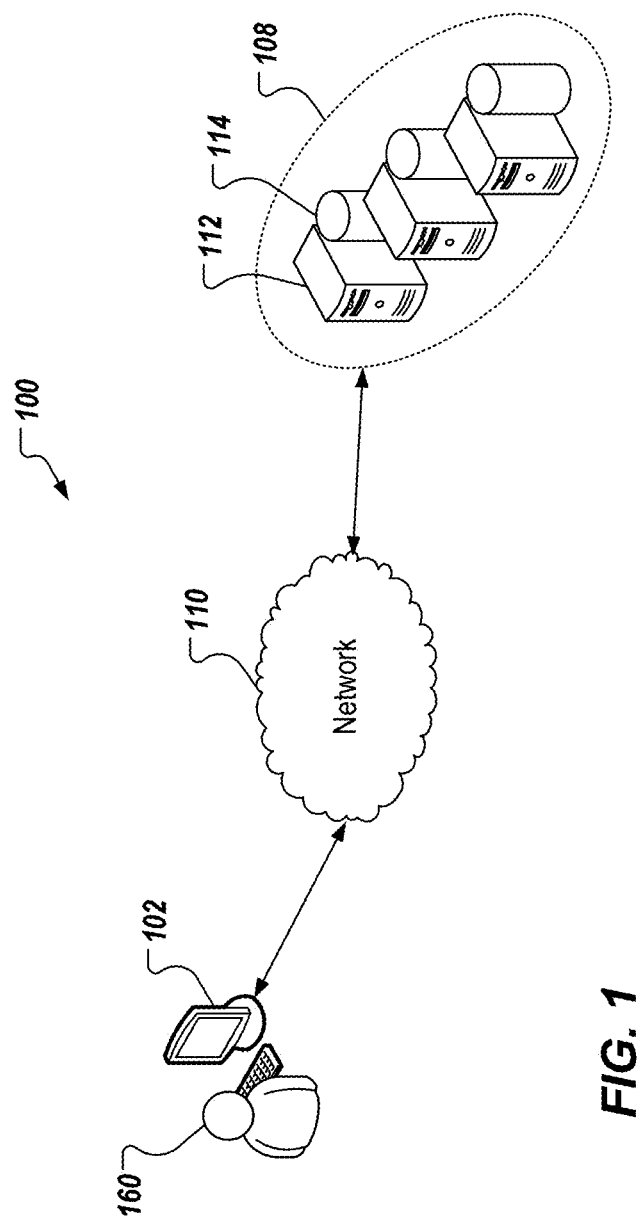
FIG. 1 depicts an example system that can execute implementations of the present disclosure.

Implementations of the present disclosure are generally directed to improving prediction accuracy of machine-learning (ML) models. More particularly, implementations of the present disclosure are directed to selectively leveraging knowledge graphs to add one or more features for improving accuracy of predicted values of a ML model. In some implementations, actions include receiving a predicted value and confidence level from a computer-executed first ML model, and determining that the confidence level is below a threshold confidence level, and in response: providing an encoding based on input data and non-textual information to the first ML model, the encoding representing characteristics of the input data relative to the predicted value, the characteristics including respective gradients of two or more features of the input data, injecting the encoding into a textual knowledge graph that corresponds to a domain of the first ML model to provide an encoded knowledge graph, receiving supplemental data based on the encoded knowledge graph, and providing a supplemental predicted value from a second ML model based on the input data and the supplemental data, the second ML model having a higher number of features than the first ML model, and the supplemental predicted value having a supplemental confidence level that exceeds the threshold confidence level.

As described in further detail herein, implementations of the present disclosure improve prediction accuracy of ML models. More particularly, implementations of the present disclosure selectively leverage knowledge graphs to add one or more features for improving accuracy of predicted values of a ML model. For example, and as described in further detail herein, an initial prediction can be provided from a ML model based on input data (input features) representing a relatively small set of features. It can be determined that an accuracy of the initial prediction is insufficient, and in response, a knowledge graph (e.g., that is specific to a domain of the ML model) can be leveraged to identify one or more supplemental features that can be used to improve prediction accuracy. In some examples supplemental features are received, and an updated prediction is provided from the ML model.

Implementations of the present disclosure are described in further detail herein with reference to a non-limiting, example context. The example context includes predicting a physiological characteristic based on a set of input physiological characteristics. In some examples, the physiological characteristic that is to be predicted includes, without limitation, an anxiety level. In some examples, the set of input physiological characteristics includes, without limitation, minutes of activity (e.g., exercise), calories burned, and heart rate. In short, and in the example context, an anxiety level is to be determined based on the features of minutes of activity, calories burned, and heart rate. It is contemplated, however, that implementations of the present disclosure can be realized in any appropriate context (e.g., predicting machine failure)

Further, in the example context, a ML model is provided as a graph of features. For example, the ML model can be provided based on regression techniques (e.g., linear regression) over historical data to generate the graph. It is contemplated, however, that implementations of the present disclosure can be realized using any appropriate ML model (e.g., decision tree, support vector machine (SVM)).

FIG. 1 depicts an example system 100 that can execute implementations of the present disclosure. The example system 100 includes a computing device 102, a back-end system 108, and a network 110. In some examples, the network 110 includes a local area network (LAN), wide area network (WAN), the Internet, or a combination thereof, and connects web sites, devices (e.g., the computing device 102), and back-end systems (e.g., the back-end system 108). In some examples, the network 110 can be accessed over a wired and/or a wireless communications link. For example, mobile computing devices, such as smartphones can utilize a cellular network to access the network 110.

In the depicted example, the back-end system 108 includes at least one server system 112, and data store 114 (e.g., database and knowledge graph structure). In some examples, the at least one server system 112 hosts one or more computer-implemented services that users can interact with using computing devices. For example, the server system 112 can host a computer-implemented service for executing predictive models, and interpreting results of predictive models in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the back-end system 108 hosts ML-based prediction platform for providing one or more predicted values based on a set of input features. More particularly, and as described in further detail herein, the ML-based prediction platform of the present disclosure can determine that the set of input features is insufficient for a sufficiently accurate prediction, and, in response, can leverage a knowledge graph for supplemental features. A prediction can be re-run based on supplemental data corresponding to the supplemental features in an effort to provide a sufficiently accurate prediction.

In some examples, a knowledge graph is a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birth place, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph, for example, [one person identifier, child of, another person identifier], where the other person identifier is a node in the graph.

As described herein, implementations of the present disclosure integrate non-textual information into a knowledge graph. In some examples, information is represented using other medium (e.g., image, video, signal). Implementations of the present disclosure address combining non-textual information in a textual-based knowledge graph.

Figure 2:
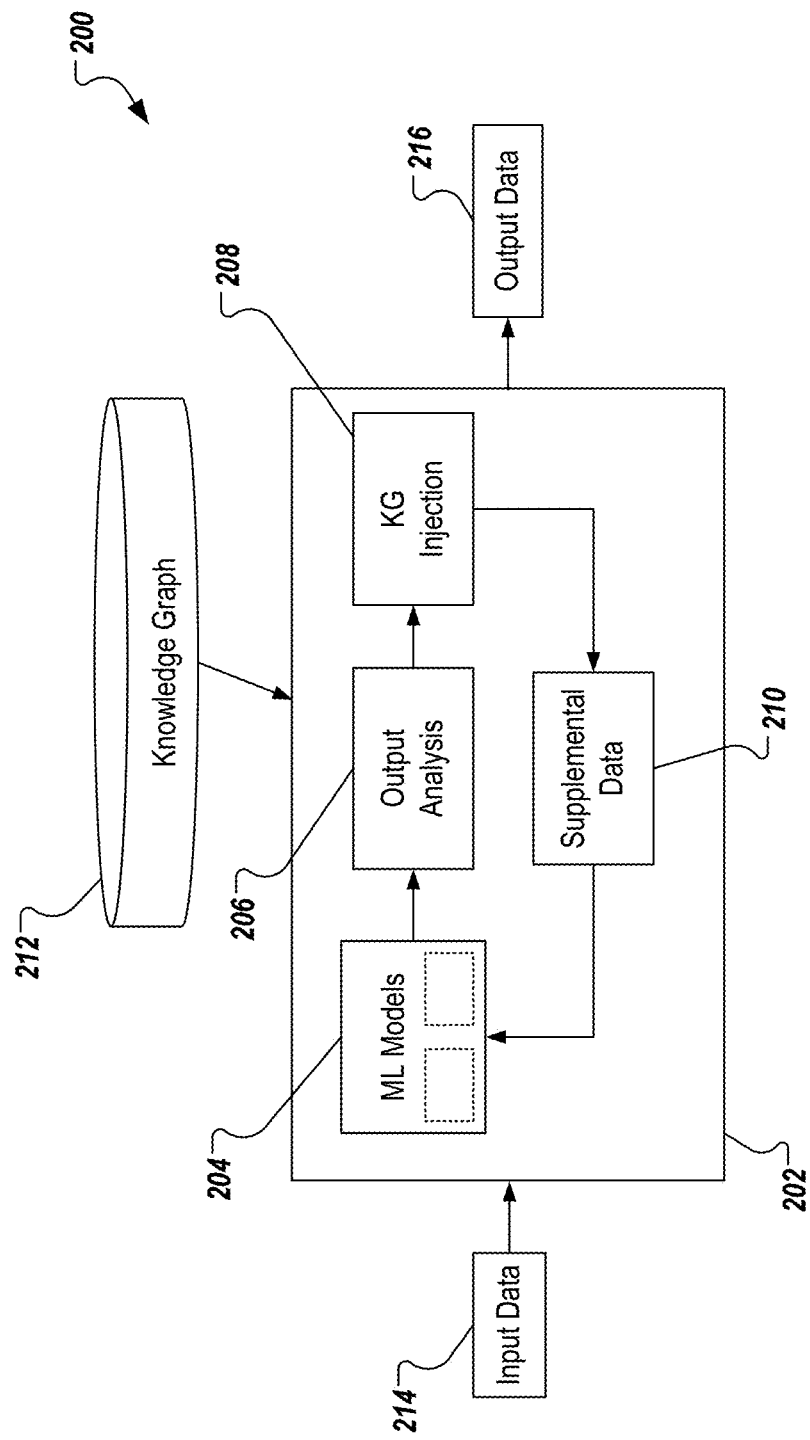
FIG. 2 depicts an example module architecture in accordance with implementations of the present disclosure.

FIG. 2 depicts an example module architecture 200 in accordance with implementations of the present disclosure. The example module architecture 200 includes a ML-based prediction system 202 that includes a ML model module 204, an output analysis module 206, a knowledge graph (KG) injection module 208, and a supplemental data module 210. In some examples, and as described in further detail herein, the ML-based prediction system 202 selectively leverages a knowledge graph 212 to determine additional features that can be input to an ML model executed in the ML module 204 in an effort to improve an accuracy of the prediction which means a high confidence score level.

In further detail, input data 214 can be input to the ML-based prediction system 202. In some examples, the input data 214 includes a set of features, and a respective values (data) for each feature. In the example context, example features include active minutes, calories burned, and heart rate. In some examples, a first ML model within the ML module 204 processes the values for the set of features, and provides a predicted value for a to-be-predicted feature. In the example context, the to-be-predicted feature is anxiety state. In some examples, the ML model also provides a confidence level associated with the predicted value. The confidence level can reflect an accuracy of the predicted value (e.g., a likelihood that the predicted value is correct).

In some implementations, the output analysis module 206 determines whether the accuracy of the predicted value is sufficient. For example, the output analysis module 206 compares the confidence level to a threshold confidence level predefined (or set). In some examples, if the confidence level meets or exceeds the threshold confidence level, the predicted value is determined to be sufficiently accurate, and is provided as output 216 from the ML-based prediction system 202. If the confidence level does not meet or exceed the threshold confidence level, the predicted value is determined to be insufficiently accurate. In response, the output analysis module 206 triggers the KG injection module 208 to determine supplemental features, for which values can be obtained to improve the accuracy of a predicted value from the ML module 204. In some examples, supplemental data corresponding to the supplemental features are provided as input to a second ML model, which accounts for the supplemental features. That is, the second ML model has a higher number of features than the first ML model.

In some implementations, the KG injection module 208 identifies a particular injection point (IP) within the knowledge graph 212. In some implementations, and as described in further detail herein, the knowledge graph 212 can include multiple IPs. To discern between the IPs, and identify the particular IP, the KG injection module 208 determines an encoding associated with the predicted value. In some examples, and as described in further detail herein, the encoding is based on characteristics of the first ML model. The KG injection module 208 compares the encoding to respective IP encodings of the knowledge graph 212 to identify the particular IP that is to be used. In some examples, if multiple IPs are possible, the KG injection module 208 determines respective similarity values for each potential IP, and selects the particular IP as the IP having the highest similarity value.

In some implementations, the KG injection module 208 determines supplemental data that is to be provided based on the knowledge graph 212, and the selected IP. In some examples, the supplemental data corresponds to one or more supplemental features in a second ML model 204 (e.g., features that were not included in the input data 214). In some examples, a channel for obtaining a value (supplemental data) for the supplemental feature is determined. Example channels can include, without limitation, an action, and a query. For example, an action can be performed to provide the value as supplemental input feature. Example actions can include, without limitation, image/video analysis, audio analysis, sensor reading, and the like. Example queries can include, without limitation, a query to a user to illicit a user response, and a query to a database to retrieve stored data.

In some implementations, the supplemental data 210 is through one or more channels, and is provided as input to the second ML model. In some examples, the supplemental data 210 is combined with the input data 214, and the second ML model processes both to provide a predicted value. In this manner, the second ML model provides the predicted value based on an expanded set of features (e.g., the features in the original set of features, and the feature(s) in the supplemental data). In some implementations, the ML-based prediction system 202 repeats this until the predicted value is of sufficient accuracy to be provided as the output data 216.

Implementations of the present disclosure are described in further detail herein with reference to the example context described above.

Figure 3A:
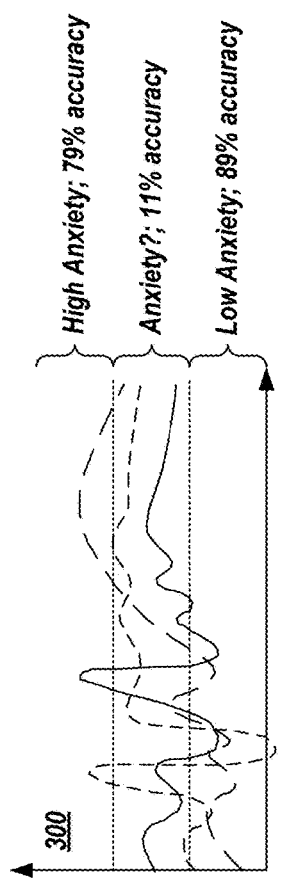
FIGS. 3A-3C depict an example machine-learning (ML) model, and example encodings in accordance with implementations of the present disclosure.
Figure 3B:
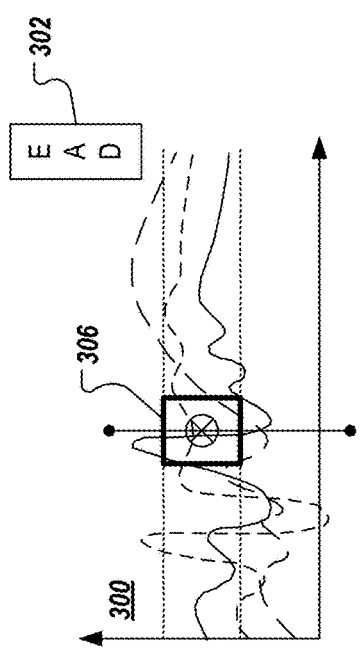
Figure 3C:
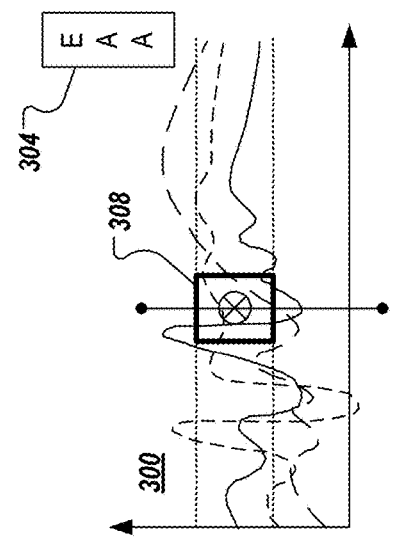

FIGS. 3A-3C depict an example machine-learning (ML) model 300, and example encodings 302, 304 in accordance with implementations of the present disclosure. The example model 300 is provided as a graph of multiple features, which include minutes of exercising an activity, calories burned, and heart rate, associated with anxiety bands 306, 308, 310 (e.g., low anxiety, presence of anxiety, and high anxiety, respectively). Each anxiety band 306, 308, 310 is associated with a respective prediction accuracy (e.g., example accuracy values are depicted in FIG. 3A).

With particular reference to FIGS. 3B and 3C, the example encodings 302, 304 are described in further detail. In some examples, each encoding 302, 304 represents characteristics of respective values of the features. Example characteristics can include, without limitation, a rate of change, and/or a direction of change. For purposes of non-limiting illustration, a direction of change will be referenced as the characteristic that is considered for encoding. In some examples, the direction of change can include ascending (A) (e.g., ascending (positive) slope), descending (D) (e.g., descending (negative) slope), or equal (E) (e.g., little to no slope, either positive, or negative).

In accordance with implementations of the present disclosure, the encodings 302, 304 are each determined based on respective data sets 306, 308. In some examples, a derivative is determined for each feature within the respective data set 306, 308 to determine the characteristics for the respective features. In the example of FIGS. 3A-3C, three features are provided (e.g., active minutes, calories burned, heart rate). Consequently, for each data set, three characteristics are provided, the characteristics defining the respective encoding 302, 304. In the example of FIG. 3B, the characteristic for active minutes of is provided as E, the characteristic for calories burned is provided as A, and the characteristic for heart rate is provided as D. Consequently, the encoding 302 is provided as EAD. In the example of FIG. 3C, the characteristic for active minutes of is provided as E, the characteristic for calories burned is provided as A, and the characteristic for heart rate is provided as A. Consequently, the encoding 304 is provided as EAA.

Figure 4A:
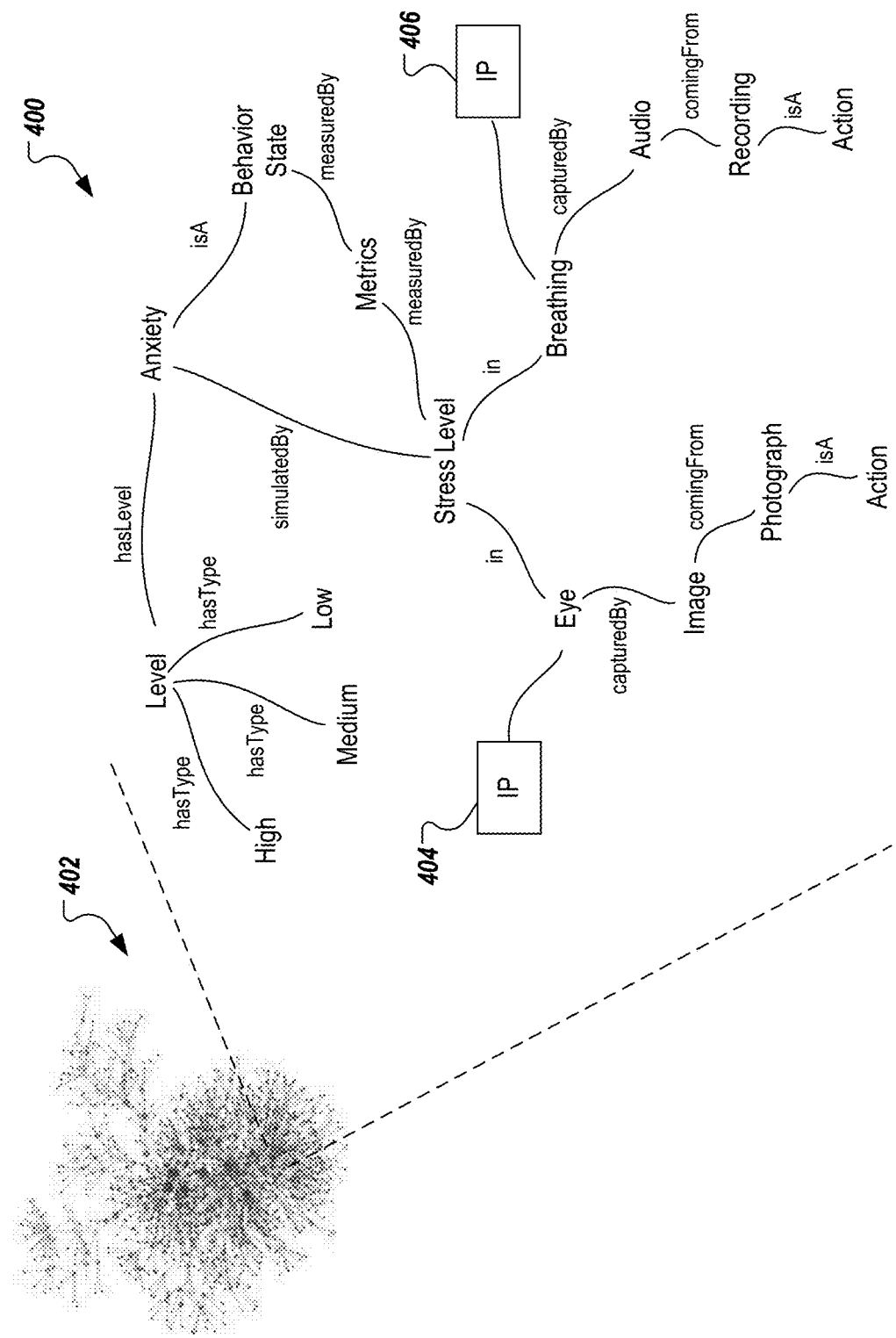
FIGS. 4A and 4B depict example encoding injection into an example knowledge graph in accordance with implementations of the present disclosure.
Figure 4B:
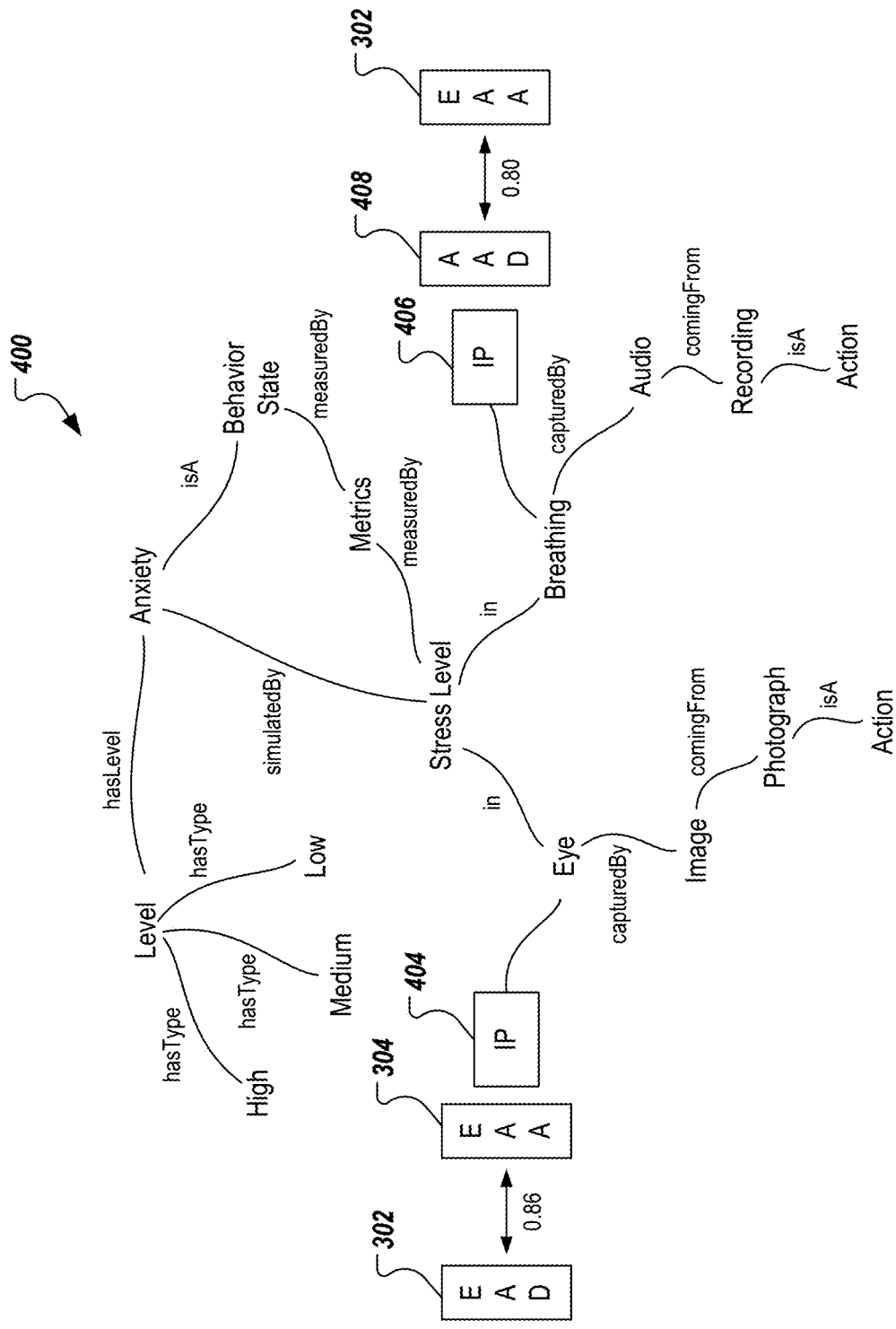

FIGS. 4A and 4B depict example encoding injection into an example portion 400 of a knowledge graph 402 in accordance with implementations of the present disclosure. In some implementations, the knowledge graph 402 is specific to a domain of the ML model. In the example context, the knowledge graph 402 is specific to physiological characteristics (e.g., of humans). In the example of FIGS. 4A and 4B, concepts corresponding to the example context are provided as nodes, and relationships between concepts are provided as edges. In accordance with implementations of the present disclosure, the knowledge graph 402 includes a plurality of IPs. In the example of FIGS. 4A and 4B two IPs 404, 406 are depicted. In some implementations, and as described in further detail herein, an IP 404, 406 can be identified to determine one or more action(s) to retrieve/generate supplemental features data that can be used to provide an updated prediction from the ML model (e.g., the second ML model).

In some implementations, and as described herein, it can be determined that an accuracy of a predicted value from the ML model is insufficient. For example, the input data 214 to the first model can be provided as the data set 306 of FIG. 3B, which provides a predicted value (e.g., yes, anxiety is present) with an accuracy of 11%. It can be determined that the accuracy is insufficient, as described herein. In response, the encoding 302 is provided, as described herein.

In some implementations, the encoding 302 is cross-referenced with encodings associated with respective IPs within the knowledge graph 402 of FIGS. 4A and 4B. For example, a super-set of IPs can be provided, and can include all IPs of the knowledge graph 402, including the IPs 404, 406. A sub-set of IPs can be provided, and can include IPs having encodings that are within Y-degree(s) of permutation of the encoding 302 (e.g., where Y is an integer that is greater than or equal to 1). By way of non-limiting example, IPs included in the sub-set of IPs include IPs having an encoding that is within 1-degree of permutation of the encoding 302. For example, the encoding 302 can be compared to the encoding 304, and it can be determined that the encoding 304 is within 1-degree of permutation of the encoding 302 (e.g., EA<u>D</u> as compared to EA<u>A</u>). Consequently, the IP 404 corresponding to the encoding 304 is included in the sub-set of IPs (see FIG. 4B). In the example of FIG. 4B, the IP 406 is associated with an encoding 408. Consequently, the IP 406 is also included in the sub-set of IPs.

In some implementations, if the sub-set of IPs includes a single IP, that IP is used to determine the supplemental features, as described herein. In some implementations, if the sub-set of IPs includes multiple IPs, a similarity score (e.g., ranging between 0 and 1) is determined for each IP in the sub-set of IPs, each similarity score representing a similarity between the encoding 302, and the encoding of a respective IP. The IP having the encoding with the highest similarity score is used to determine the supplemental features, as described herein. In the example of FIG. 4B, a similarity score of 0.86 is determined for the encoding 304, and a similarity score of 0.80 is determined for the encoding 408. Consequently, the IP 404 is used to determine the supplemental features, as described herein.

In some implementations, the similarity score is determined based on a degree of difference between the data sets underlying the respective encodings. For example, the data set 306 of FIG. 3B, which resulted in the encoding 302 can be compared to the data set 308 of FIG. 3C, which resulted in the encoding 304. In some examples, the similarity score is determined as a statistical value between the existing other encoded data (other encoding existing in the knowledge graph). Example statistical values can include, without limitation, average error, standard deviation, and mean absolute error. In some examples, the statistical value can be normalized to be within pre-defined range (e.g., between 0 and 1).

As described herein, one or more supplemental features can be determined based on the identified IP. In some examples, nodes that are related to the IP within the knowledge graph are followed to identify one or more actions that can be performed to provide the supplemental features. In the example of FIG. 4B, the IP 404 is selected, as described above. In this example, it can be determined that an image of a retina is to be captured, and analyzed. If, on the other hand, the IP 406 had been selected, it would have been determined that a recording of breathing is to be captured, and analyzed.

In some examples, a user is prompted to provide supplemental data corresponding to the one or more actions. For example, the user, for which the predicted value is being determined can be prompted. In the example context, the user (e.g., a user 160 of FIG. 1) can be interacting with the ML-based prediction system 202 to determine their anxiety level. In some examples, prompting of the user can include having the user perform one or more actions, and/or having the user answer one or more queries. In some examples, one or more queries can be directly provided to the user. In some examples, one or more queries can be prompted based on an action that the user has been requested to perform.

Continuing with the example of FIG. 4B, the user can be prompted to provide an image of their eye. For example, a user interface (UI) can be displayed requesting that the user capture an image of their eye (e.g., using an image capture device of the computing device 102 of FIG.). In some examples, the image can be processed (e.g., using digital image processing) to determine one or more features, and one or more queries to the user can be determined based on the one or more features. For example, the image can be processed, and it can be determined that a color is yellow, and veins are visible, this information extracted from retina image determines existence of stress or lack of sleep, etc.

In some implementations, the features can be provided as the supplemental data back to a higher feature count ML model to provide an updated predicted value, as described herein. For example, supplemental data of yellow color, and visible veins can interpreted as an existence of a stress supplemental feature or a lack of sleep supplemental feature to be combined with the original input features (example: active minutes, calories burned, heart rate) 214 to the second ML model, which can provide an updated predicted value. In some examples, if the updated predicted value has a sufficient accuracy, the updated predicted value is provided as the output data 216. In some examples, if the updated predicted value does not have a sufficient accuracy, the processes described herein can be repeated to provide additional supplemental data, and another updated predicted value can be determined.

In some implementations, one or more queries can be determined based on the features that are determined from the output of the one or more actions. Continuing with the example above, the digital imaging process resulted in features of yellow color, and visible veins in the user's eye. In some implementations, the features can be processed based on one or more rules to determine the one or more queries. In some examples, the one or more rules relate features to one or more queries, and identified queries can be posited to the user. In the current example, a set of rules can relate the features as symptoms that can be attributed to one or more causes. For example, a first rule can associate yellow color, and visible veins with smoking (e.g., more than X cigarettes per day), and a lack of sleep (e.g., less than Y hours). A second rule can associate yellow color, and visible veins with coffee intake (e.g., more than Z fluid ounces in less than Y hours).

In some implementations, a set of predicates is provided based on all of the identified causes. In some examples, the predicates are determined based on the rules used to identify the causes. For example, a rule can include one or more predicates that, if met (e.g., by date provided from image/audio analysis) trigger the rule. Continuing with the example above, a set of predicates can include [cigarettes, coffee, sleep]. In some implementations, a set of queries is determined based on the set of predicates. In some examples, the set of queries is provided as a minimum explorative questions for the identified causes.

In some implementations, the set of queries is provided based on a knowledge graph. In some examples, the knowledge graph can include the knowledge graph used with the encoding, as described herein (e.g., the knowledge graph 402 of FIGS. 4A and 4B). In some examples, the knowledge graph can be a different knowledge graph (e.g., a knowledge graph that is specific to a domain of the predicates). FIG. 5 depicts an example portion 500 of a knowledge graph (e.g., the knowledge graph 402). In the depicted example, the example portion 500 reflects the predicates determined for the above example (e.g., [cigarettes, coffee, sleep]), and relationships between predicates.

In accordance with implementations of the present disclosure, one or more most-general predicates are determined. In some examples, a general predicate includes a predicate that encompasses two or more other predicates. In the example of FIG. 5, the predicate excitant is the most-general predicate for the predicates cigarettes and coffee. Consequently, excitant is selected as a most-general predicate. Also in the depicted example, the predicate sleep is not related to any other predicates in the example portion 500. Consequently, the predicate sleep can itself be considered a most-general predicate. Accordingly, the example of FIG. 5, provides most-general predicate of sleep and excitant.

In some implementations, a query is provided for each most-general predicate, and is included in the set of queries. In this manner, the set of queries represents minimum explorative questions for the identified causes. That is, for example, instead of a query for each predicate, a reduced number of queries can be provided by a query for each most-general predicate. With reference to the continued example above, example queries can include:

How much sleep did you get?

How much excitant did you get?

In accordance with implementations of the present disclosure, queries in the set of queries are posited to the user to elicit supplemental data from the user. That is, for example, the supplemental data is received as the user's responses to the queries. In some examples, the queries are displayed to the user on a computing device (e.g., the computing device 102 of FIG. 1).

By providing the set of queries as the minimum explorative questions for the identified causes the number of queries to be posed to the user can be reduced. For example, the example above provides two queries. Has the predicates been used to provide the queries, three queries would have been provided (e.g., a query for each of coffee, sleep, and cigarettes). This has benefits in reducing the amount of data sent back/forth between the ML-based prediction system 202 and the user. Further, this improves the accuracy of supplemental data that is provided, which, in turn, improves the accuracy of the updated predicted value that is next provided from the ML model 204. For example, and continuing with the example above, example responses to the example queries can include:

How much sleep did you get? 4 hours

How much excitant did you get? Alcohol, 36 fl. ozs., and Cigarettes, 12

Accordingly, the supplemental data includes an amount of sleep, an amount of alcohol, and a number of cigarettes. In contrast, and had the queries included queries for each of the original predicates (e.g., coffee, cigarettes, sleep), the user response would not include the supplemental data of amount of alcohol. That is, for example, the user would have been queried about coffee, specifically, and would have provided a null response (e.g., Coffee, 0 fl. ozs.). Because the user would not have been specifically queried on alcohol, the response for alcohol would not be provided.

Accordingly, implementations of the present disclosure selectively leverage knowledge graphs to enhance input data to a higher feature count ML model to improve the accuracy of a predicted value provided by the ML model. The following tables summarize this process, based on the example continued throughout:

TABLE 1

Initial Prediction based on Non-supplemented Input Features

| Minutes of Activity | Calories Burned | Heart Rate | Anxiety | Confidence (Accuracy) |
|---|---|---|---|---|
| 10 | 110 | 120 | No | 12% |

TABLE 2

Updated Prediction based on Supplemented Input Features

| Min. Act. | Cals. | HR | Alcohol | Sleep | Cigarettes | Anxiety | Conf. |
|---|---|---|---|---|---|---|---|
| 10 | 110 | 120 | 36 | 4 | 12 | Yes | 98% |

Figure 6:
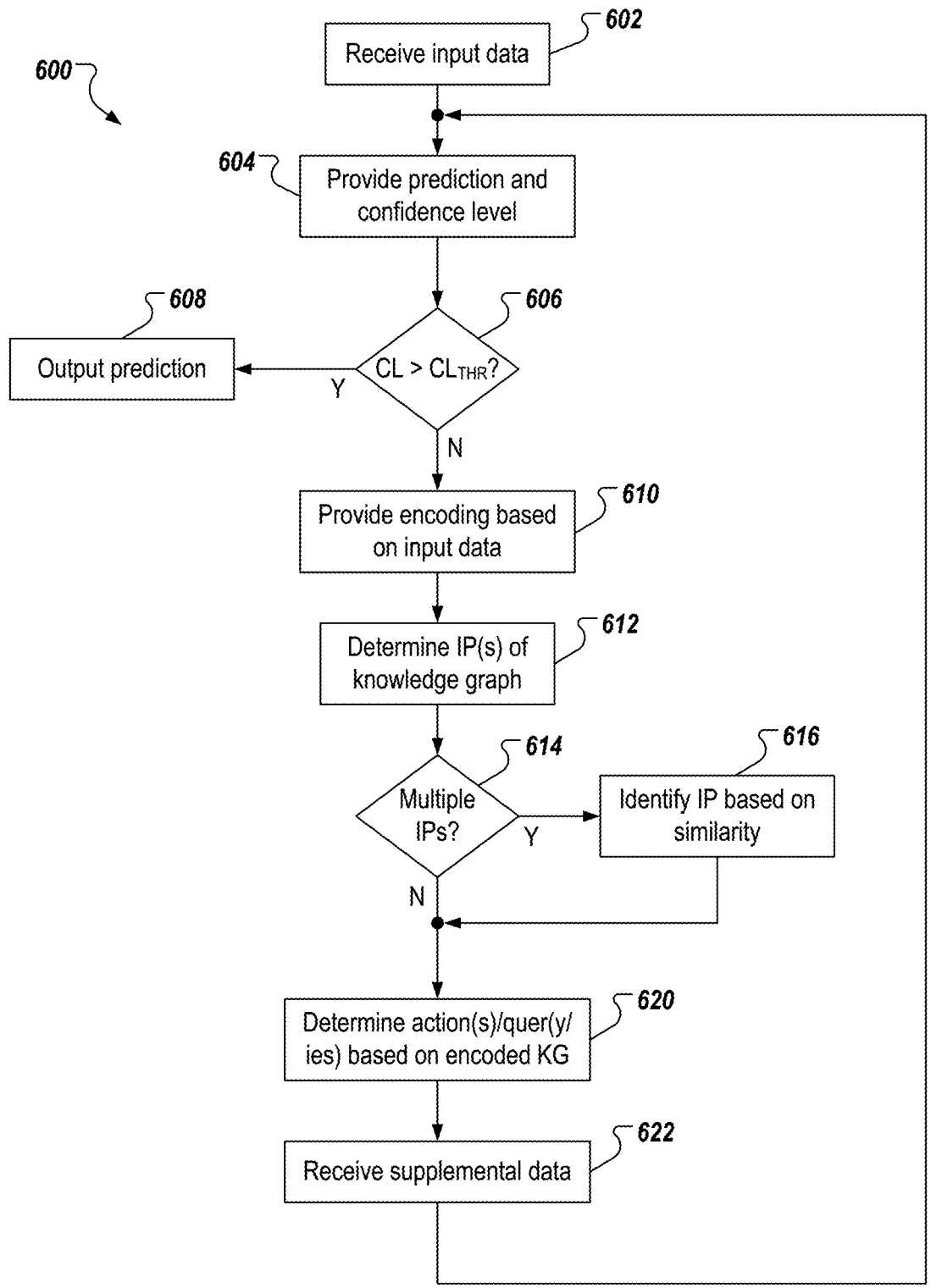
FIG. 6 depicts an example process that can be executed in implementations of the present disclosure.

FIG. 6 depicts an example process 600 that can be executed in implementations of the present disclosure. In some examples, the example process 600 is provided using one or more computer-executable programs executed by one or more computing devices (e.g., the back-end system 108 of FIG. 1).

Input data is received (602). For example, an initial set of input data (e.g., the input data 214 of FIG. 2) is received by an ML-based prediction system (e.g., the ML-based prediction system 202 of FIG. 2). A prediction value and corresponding confidence level (CL) are provided (604). For example, a ML model (e.g., the ML model 204 of FIG. 1) processes the initial set of input data to provide the prediction value, and the corresponding CL (e.g., No anxiety, CL=12%, from Table 1 above). It is determined whether the CL exceeds a threshold CL ($CL_{THR}$) (606). For example, an output analysis module (e.g., the output analysis module 206 of FIG. 2) receives the predicted value and CL, and determined whether the CL exceeds $CL_{THR}$. If the CL exceeds the $CL_{THR}$, the predicted value is output (608). For example, the ML-based prediction platform outputs the predicted value (and CL) as output data (e.g., the output data 216 of FIG. 2).

If the CL does not exceed the $CL_{THR}$, an encoding is provided based on the input data (610). For example, and as described herein, an encoding is provided that represents characteristics of the input data relative to the predicted value. In some examples, and as described with reference to FIGS. 3A-3C, an example encoding represents gradients of input data (e.g., E, A, D). A set of IPs of a knowledge graph is determined (612). For example, and as described herein, the encoding of the input data is compared to encodings of IPs within a knowledge graph to provide the set of IPs. It is determined whether there are multiple IPs in the set of IPs (614). If there are multiple IPs in the set of IPs, an IP is identified based on similarity (616). For example, and as described above, respective similarity scores are determined for the encoding provided from the input data, and encodings of IPs in the set of IPs. The IP associated with the encoding having the highest similarity score is selected. One or more actions, and/or queries are determined based on a knowledge graph (620). For example, and as described herein, an action can be determined based on the IP of the knowledge graph (e.g., take image of eye). Data from the action (e.g., image data) can be processed to provide one or more outputs (e.g., features derived from the image). The outputs can be processed using a set of rules to determine one or more causes, each cause being associated with one or more predicates. The predicates can be processed using a knowledge graph to determine one or more most-general predicates, and a set of queries can be provided (e.g., as described above with reference to FIG. 5). Queries of the set of queries can be posited to a user to elicit one or more respective responses.

Supplemental data is received (622), and the example process 600 loops back to provide an updated predicted value based on the supplemental data, as described herein. For example, the user can provide one or more responses to queries in the set of queries, which responses are the supplemental data. The supplemental data can be combined with the original input data, which can be processed by a higher feature count ML model (than the ML model used for the initial prediction) to provide the updated predicted value, and corresponding CL (e.g., Yes, anxiety, CL=98%, from Table 2 above).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for improving accuracy of predictions of machine-learning models with input data, the method being executed by one or more processors and comprising:
   receiving, by the one or more processors, a predicted value and confidence level from a computer-executed first machine-learning (ML) model; and
   determining, by the one or more processors, that the confidence level is below a threshold confidence level, and in response:
      providing an encoding based on input data and non-textual information to the first ML model, the encoding representing characteristics of the input data relative to the predicted value, the characteristics comprising respective gradients of two or more features of the input data,
      injecting the encoding into a textual knowledge graph that corresponds to a domain of the first ML model to provide an encoded knowledge graph, injecting the encoding at least partially comprising providing a link between the encoding and one or more nodes of the textual knowledge graph,
      receiving supplemental data based on the encoded knowledge graph, and
      providing a supplemental predicted value from a second ML model based on the input data and the supplemental data, the second ML model having a higher number of features than the first ML model, and the supplemental predicted value having a supplemental confidence level that exceeds the threshold confidence level.

2. The method of claim 1, wherein at least part of the input data varies over a temporal dimension.

3. The method of claim 1, wherein injecting the encoding into a knowledge graph comprises:
   comparing the encoding to respective encodings of a set of injection points (IPs) included in the knowledge graph to provide a sub-set of IPs, and
   identifying an IP in the sub-set of IPs to determine one or more channels for obtaining the supplemental data.

4. The method of claim 3, wherein the sub-set of IPs comprises one or more IPs having a respective encoding that is within a pre-defined degree of permutation from the encoding.

5. The method of claim 3, wherein identifying an IP in the sub-set of IPs comprises:
   determining that the set of IPs comprises multiple IPs, and, in response, providing respective similarity scores; and
   identifying the IP as having a highest similarity score among the similarity scores.

6. The method of claim 1, wherein the supplemental data comprises one or more user responses to one or more queries transmitted to a user.

7. The method of claim 6, wherein the one or more queries are determined based on at least one action, the action resulting in data that is processed to provide the one or more queries.

8. A non-transitory computer-readable storage medium coupled to one or more processors and having instructions stored thereon which, when executed by the one or more processors, cause the one or more processors to perform operations for improving accuracy of predictions of machine-learning models with input data, the operations comprising:
receiving a predicted value and confidence level from a computer-executed first machine-learning (ML) model; and
determining that the confidence level is below a threshold confidence level, and in response:
providing an encoding based on input data and non-textual information to the first ML model, the encoding representing characteristics of the input data relative to the predicted value, the characteristics comprising respective gradients of two or more features of the input data,
injecting the encoding into a textual knowledge graph that corresponds to a domain of the first ML model to provide an encoded knowledge graph, injecting the encoding at least partially comprising providing a link between the encoding and one or more nodes of the textual knowledge graph,
receiving supplemental data based on the encoded knowledge graph, and
providing a supplemental predicted value from a second ML model based on the input data and the supplemental data, the second ML model having a higher number of features than the first ML model, and the supplemental predicted value having a supplemental confidence level that exceeds the threshold confidence level.

9. The computer-readable storage medium of claim 8, wherein at least part of the input data varies over a temporal dimension.

10. The computer-readable storage medium of claim 9, wherein injecting the encoding into a knowledge graph comprises:
comparing the encoding to respective encodings of a set of injection points (IPs) included in the knowledge graph to provide a sub-set of IPs, and
identifying an IP in the sub-set of IPs to determine one or more channels for obtaining the supplemental data.

11. The computer-readable storage medium of claim 10, wherein the sub-set of IPs comprises one or more IPs having a respective encoding that is within a pre-defined degree of permutation from the encoding.

12. The computer-readable storage medium of claim 11, wherein identifying an IP in the sub-set of IPs comprises:
determining that the set of IPs comprises multiple IPs, and, in response, providing respective similarity scores; and
identifying the IP as having a highest similarity score among the similarity scores.

13. The computer-readable storage medium of claim 9, wherein the supplemental data comprises one or more user responses to one or more queries transmitted to a user.

14. The computer-readable storage medium of claim 13, wherein the one or more queries are determined based on at least one action, the action resulting in data that is processed to provide the one or more queries.

15. A system, comprising:
one or more processors; and
a computer-readable storage device coupled to the one or more processors and having instructions stored thereon which, when executed by the one or more processors, cause the one or more processors to perform operations for improving accuracy of predictions of machine-learning models with input data, the operations comprising:
receiving a predicted value and confidence level from a computer-executed first machine-learning (ML) model; and
determining that the confidence level is below a threshold confidence level, and in response:
providing an encoding based on input data and non-textual information to the first ML model, the encoding representing characteristics of the input data relative to the predicted value, the characteristics comprising respective gradients of two or more features of the input data,
injecting the encoding into a textual knowledge graph that corresponds to a domain of the first ML model to provide an encoded knowledge graph, injecting the encoding at least partially comprising providing a link between the encoding and one or more nodes of the textual knowledge graph,
receiving supplemental data based on the encoded knowledge graph, and
providing a supplemental predicted value from a second ML model based on the input data and the supplemental data, the second ML model having a higher number of features than the first ML model, and the supplemental predicted value having a supplemental confidence level that exceeds the threshold confidence level.

16. The system of claim 15, wherein at least part of the input data varies over a temporal dimension.

17. The system of claim 16, wherein injecting the encoding into a knowledge graph comprises:
comparing the encoding to respective encodings of a set of injection points (IPs) included in the knowledge graph to provide a sub-set of IPs, and
identifying an IP in the sub-set of IPs to determine one or more channels for obtaining the supplemental data.

18. The system of claim 17, wherein the sub-set of IPs comprises one or more IPs having a respective encoding that is within a pre-defined degree of permutation from the encoding.

19. The system of claim 18, wherein identifying an IP in the sub-set of IPs comprises:
determining that the set of IPs comprises multiple IPs, and, in response, providing respective similarity scores; and
identifying the IP as having a highest similarity score among the similarity scores.

20. The system of claim 16, wherein the supplemental data comprises one or more user responses to one or more queries transmitted to a user.

21. The system of claim 20, wherein the one or more queries are determined based on at least one action, the action resulting in data that is processed to provide the one or more queries.

22. A computer-implemented method for improving accuracy of predictions of machine-learning models with input data, the method being executed by one or more processors and comprising:
- receiving, by the one or more processors, a predicted value and confidence level from a computer-executed first machine-learning (ML) model; and
- determining, by the one or more processors, that the confidence level is below a threshold confidence level, and in response:
  - providing an encoding based on input data and non-textual information to the first ML model, the encoding representing characteristics of the input data relative to the predicted value, the characteristics comprising respective gradients of two or more features of the input data,
  - injecting the encoding into a textual knowledge graph that corresponds to a domain of the first ML model to provide an encoded knowledge graph, injecting comprising comparing the encoding to respective encodings of a set of injection points (IPs) included in the knowledge graph to provide a sub-set of IPs, and identifying an IP in the sub-set of IPs to determine one or more channels for obtaining the supplemental data,
- receiving supplemental data based on the encoded knowledge graph, and
- providing a supplemental predicted value from a second ML model based on the input data and the supplemental data, the second ML model having a higher number of features than the first ML model, and the supplemental predicted value having a supplemental confidence level that exceeds the threshold confidence level.

\* \* \* \* \*